United States Patent [19]

Chikuma et al.

[11] Patent Number: 4,874,183
[45] Date of Patent: Oct. 17, 1989

[54] FOUR-WHEEL STEERING APPARATUS OF A VEHICLE

[75] Inventors: Isamu Chikuma; Satoru Shimada; Hiroshi Eda, all of Maebashi, Japan

[73] Assignee: Nippon Seiko Kabushiki Kaisha, Tokyo, Japan

[21] Appl. No.: 216,183

[22] Filed: Jul. 7, 1988

[30] Foreign Application Priority Data

Jul. 31, 1987 [JP] Japan ............................ 62-190282

[51] Int. Cl.$^4$ ............................................. B62D 7/14
[52] U.S. Cl. ................................. 280/91; 180/141
[58] Field of Search ................ 280/91; 180/140, 141

[56] References Cited

U.S. PATENT DOCUMENTS

| 1,691,020 | 11/1928 | Brinton | 280/91 |
| 2,995,380 | 8/1961 | King | 280/91 |
| 4,505,491 | 3/1985 | Sano et al. | 280/91 |
| 4,572,316 | 2/1986 | Kanazawa et al. | 280/91 |

Primary Examiner—Kenneth R. Rice
Attorney, Agent, or Firm—Shapiro and Shapiro

[57] ABSTRACT

A four-wheel steering apparatus of a vehicle has a front-wheel steering mechanism for steering front wheels, a rear-wheel steering mechanism for steering rear wheels, a steering gear mechanism operatively connected to the front-wheel steering mechanism and effecting a steering operation, a steering angle extracting mechanism operatively connected to the steering mechanism and extracting the steering angle of the front wheels, the steering angle extracting mechanism comprising a restraining member movable axially along the axis of the front wheels in response to the steering operation, and a string member fixed to the restraining member and displaceable in the lengthwise direction thereof in response to the movement of the restraining member, and rear-wheel steering angle control mechanism operatively connected to the steering angle extracting mechanism for controlling the amount and the direction of steer to be transmitted to the rear wheels, the rear-wheel steering angle control mechanism comprising a rotatable member rotatable in response to the displacement of the string member, and a transmission member movably engaged with the rotatable member and movable in conformity with the amount and the direction of rotation of the rotatable member for transmitting the amount of movement thereof to the rear-wheel steering mechanism.

6 Claims, 4 Drawing Sheets

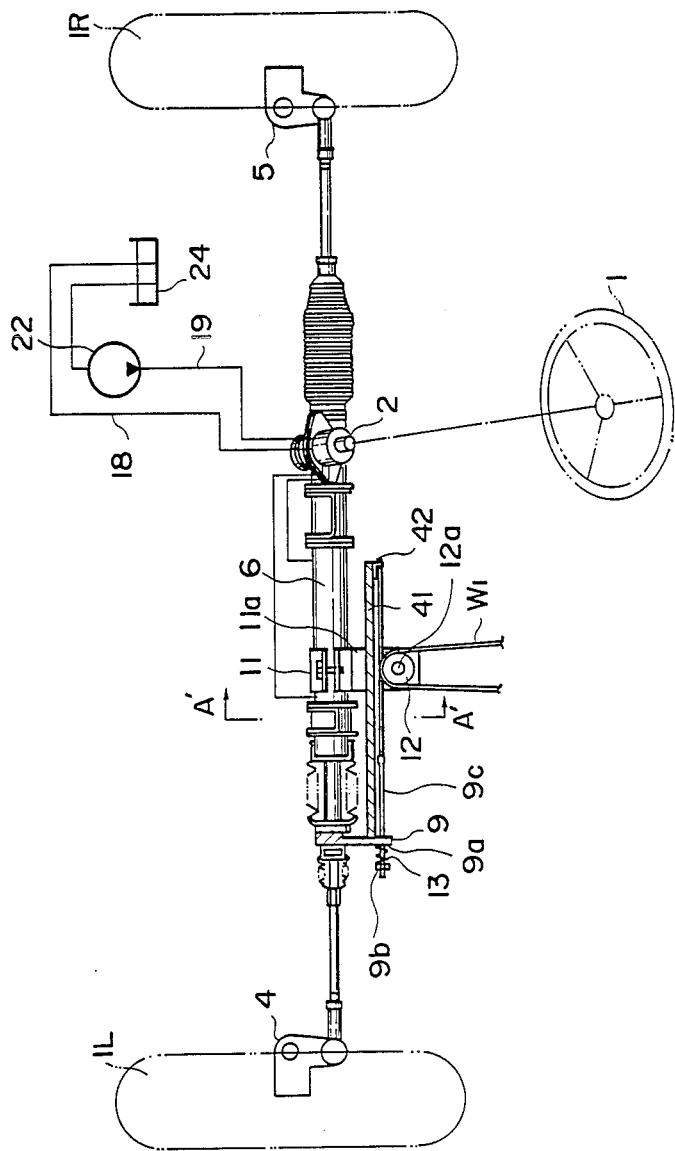

FOUR-WHEEL STEERING APPARATUS OF A VEHICLE

BACKGROUND OF THE INVENTION

1. Field of the Invention

This invention relates to a four-wheel steering apparatus of a vehicle which can steer both front wheels and rear wheels, and more particularly to a four-wheel steering apparatus provided with a steering angle extracting mechanism which can easily extract the steering angle of the front wheels and has a high degree of freedom of design and an improved rear-wheel steering mechanism.

2. Related Background Art

In a conventional four-wheel steering apparatus, hydraulic type power steering is provided in respective steering mechanisms for front wheels and rear wheels, and the front-wheel and rear-wheel steering mechanisms are connected together through a rack, a pinion and an intermediate rod or the like. A control mechanism for electronically controlling the steering ratio between the front and rear wheels according to the vehicle speed is provided in the rear-wheel side power steering. Accordingly, the steering angle of the front wheels resulting from the operation of the steering wheel is extracted from the position of the rack and is transmitted to the control mechanism by the intermediate rod through the rack and pinion mechanism, and the control mechanism controls the steering angle to be given to the rear wheels according to the steering angle of the front wheels and the vehicle speed taken into account at the same time. By the effect of such control, the driving state of the vehicle becomes stable both during low speed and during high speed.

However, the above-described conventional four-wheel steering apparatus suffers from the following disadvantages.

The extracting mechanism of the steering angle of the front wheels is constituted by a pinion meshing with a rack provided on the tie rod or the like of the front wheels. In the conventional four-wheel steering apparatus, there is provided a plurality of locations in which the rack and the pinion mesh with each other. However, to extract the steering angle by the rack and the pinion and thereby transmit the steering angle, it is necessary to bring the rack and the pinion into accurate meshing engagement with each other without any backlash and consideration must be given in terms of space during designing so that the positions of meshing engagement and the position of the intermediate rod have to be optimum relative to the vehicle. This leads to the problem that the mechanism for extracting the steering angle of the front wheels becomes complex or the level of freedom of design of the entire apparatus is low. Further, the rear-wheel steering control mechanism often becomes complex and costly. Thus, it has been difficult to realize a light weight and low cost four-wheel steering apparatus.

SUMMARY OF THE INVENTION

Accordingly, it is an object of the present invention to provide a four-wheel steering apparatus in which the taking-out mechanism of the steering angle of the front wheels is simple and the level of freedom of design for the apparatus is high and which is light in weight and low in cost.

To accomplish the above mentioned object, the present invention provides four-wheel steering apparatus of a vehicle comprising a front-wheel steering mechanism for steering front wheels, a rear-wheel steering mechanism for steering rear wheels, a steering gear mechanism operatively connected to said front-wheel steering mechanism and effecting a steering operation, a steering angle extracting mechanism operatively connected to said steering gear mechanism and extracting the steering angle of the front wheels, said steering angle extracting mechanism comprising a restraining member movable axially along the axis of the front wheels in response to the steering operation, and a string member fixed to said restraining member and displaceable lengthwise in response to the movement of said restraining member, and rear-wheel steering angle control means operatively connected to said steering angle extracting mechanism for controlling the amount and the direction of steering to be transmitted to the rear wheels, said rear-wheel steering angle control means comprising a rotatable member rotatable in response to the displacement of said string member, and a transmission member movably engaged with said rotatable member and movable in conformity with the amount and the direction of rotation of said rotatable member for transmitting the amount of movement thereof to said rear-wheel steering mechanism.

According to the four-wheel steering apparatus of the present invention which has the construction as described above, it becomes easy to extract the steering angle of the front wheels, the level of freedom of design of the entire apparatus is improved, and the rear-wheel steering control mechanism becomes simple in construction.

BRIEF DESCRIPTION OF THE DRAWINGS

FIG. 2 shows a front-wheel steering mechanism showing an embodiment of the front-wheel steering angle extracting mechanism differing from that of FIG. 1.

FIG. 3 is a cross-sectional view taken along line A—A of FIG. 1 and along line A'—A' of FIG. 2.

DESCRIPTION OF THE PREFERRED EMBODIMENTS

Figure 1:
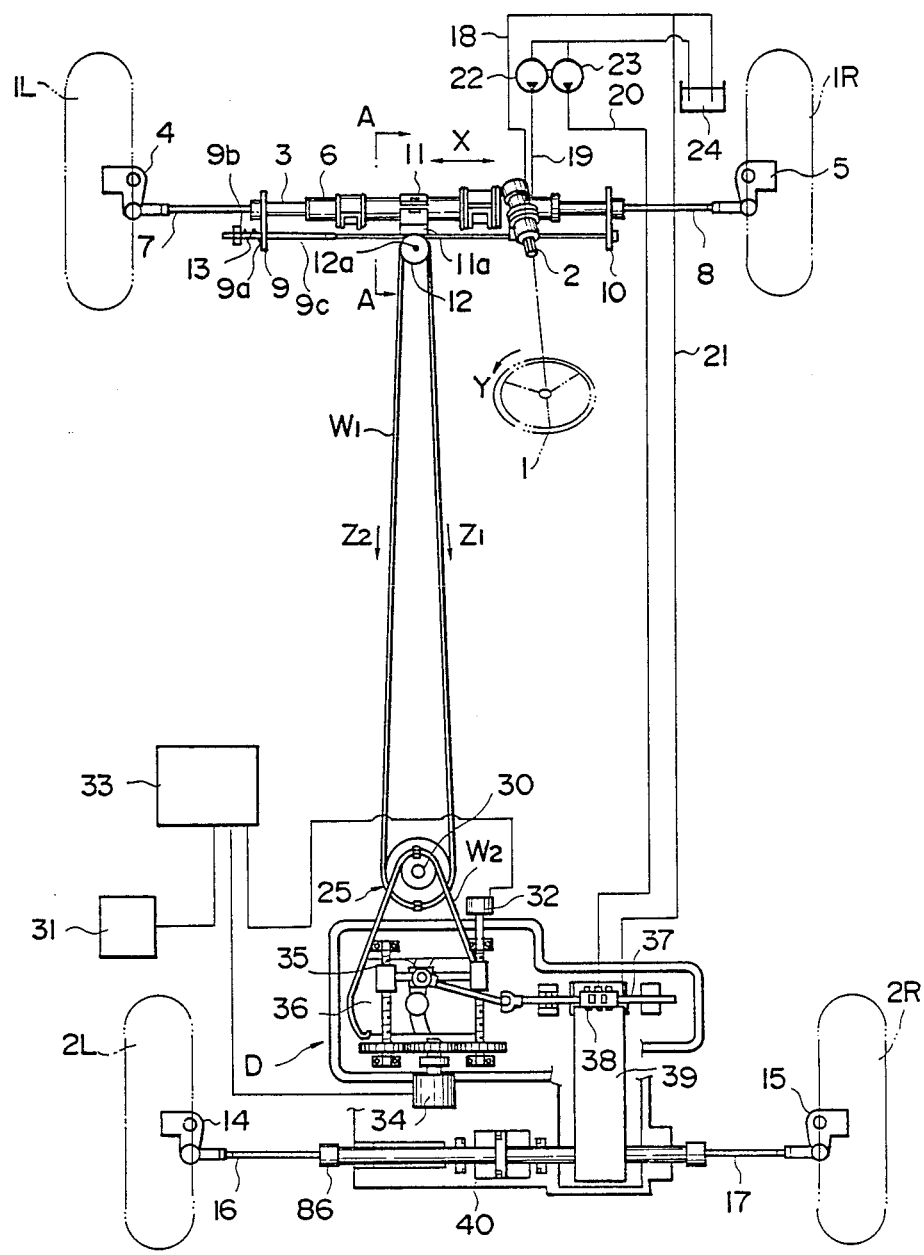
FIG. 1 is a general system diagram of a four-wheel steering apparatus according to an embodiment of the present invention.

Some embodiments of the present invention will hereinafter be described in detail with reference to the accompanying drawings. In the drawings, the same portions are given the same reference numerals.

FIG. 1 is a general system diagram showing a four-wheel steering apparatus according to an embodiment of the present invention. Front wheels 1L and 1R are steerably connected to a rack shaft 3 of the front wheels through knuckle arms 4 and 5 and tie rods 7 and 8, respectively. The rack shaft 3 is axially movably disposed in a gear box 6. The gear box 6 is fixed to a vehicle body (not shown) immovably in the axial direction.

A fixed member 11 is firmly fixed to the outer peripheral surface of the gear box 6 by a bolt or the like (not shown). The fixed member 11 is axially immovable, and is integral with the gear box 6. A steering operating member 2 is in engagement with the rack shaft 3 so that the amount of rotational movement of the steering operating member 2 can be extracted as the amount of axial movement of the rack shaft. The steering operating member 2 is usually a pinion, and a rack portion (not shown) meshing with this pinion is formed on the rack shaft 3. The steering operating member 2 is further connected to a steering wheel 1, and transmits the amount of steer by the steering wheel 1 to the rack shaft 3 for steering the front wheels 1R and 1L.

The fixed member 11 has a flange portion 11a extending substantially perpendicularly to the axial direction, of rack shaft 3 and a small pulley 12 having two pulley grooves of the same size is provided on the end of the flange portion 11a so as to be rotatable about a shaft 12a and a first wire $W_1$ is relatively slidably contained in the grooves so that the opposite end portions thereof cross each other. The lengthwisely central portion of the first wire $W_1$ passes over a large pulley 25, constituting a displacement reduction portion to be described later, and is fixed to one end of the outer periphery of the large pulley 25. One end of the first wire $W_1$ which passes over the small pulley 12 is fixed to an end plate 10 fixed to an axial end portion of the rack shaft 3. Another end plate 9 is fixed to the other end portion of the rack shaft 3 and the other end of the wire $W_1$ is fixed to the tip end of an axially movable shaft 9c which extends through end plate 9. A fixed piece 9b is fixed to that end portion of the shaft 9c extending through the end plate 9 which is adjacent to the wheel 1L. A spring 13 is provided around the shaft 9c between the end surface 9a of the end plate 9 and the fixed piece 9b opposed thereto, and it biases the fixed piece 9b away from the end plate 9 so as to impart predetermined tension to the wire $W_1$. With the above-described construction, when the rack shaft 3 moves axially in the direction of arrow X, the wire $W_1$ is displaced around the small pulley 12 and moves in the direction of arrow $Z_1$ or $Z_2$ as will be described later.

The steering operating member 2, as is well known, is power-assisted by a power steering mechanism operated by hydraulic pressure through a hydraulic source 24, a hydraulic pump 22 and oil paths 18 and 19. A hydraulic pump 23 and oil paths 20 and 21 assist the power steering mechanism of the rear wheels.

The first wire $W_1$ and small pulley 12 in FIG. 2 are shown in an another embodiment changed from the embodiment shown in FIG. 1. In this case, the method of fixing the end portion of the first wire $W_1$ somewhat differs from that shown in FIG. 1. More particularly a rod 41 fixed to the end plate 9 extends therefrom by a predetermined distance and one end of the wire $W_1$ is fixed to the tip end portion 42 of the rod 41. With such a construction, there is produced a surplus of space, more so than embodiment shown in FIG. 1, and the level, of freedom of design becomes still higher. In this embodiment, the other end of the wire $W_1$ is fixed as in the case of the previous embodiment.

Figure 4:
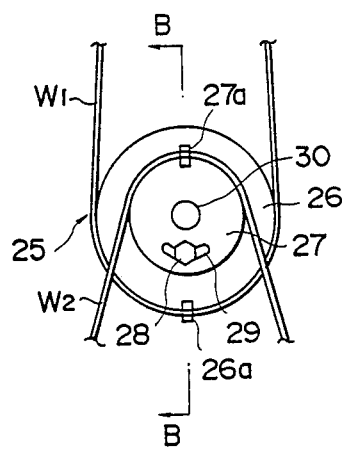
FIG. 4 shows the details of a displacement reduction mechanism and a neutral phase adjusting mechanism.
Figure 5:
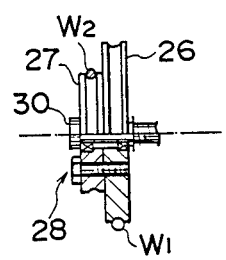
FIG. 5 is a cross-sectional view taken along line B—B of FIG. 4.

Turning back to FIG. 1, the first-wire $W_1$ is fixed to the large pulley 25. When the rack shaft 3 is axially displaced, the front wheel steering angle extracting mechanism displaces the wire $W_1$ in the direction of arrow $Z_1$ or $Z_2$. Therefore, the large pulley 25, to which the central portion of the wire $W_1$ is fixed, is also rotated. As shown in FIGS. 4 and 5, the large pulley 25 comprises is large and is small discs 26 and 27 having annular pulley grooves and rotatably fixed to a chassis base or the like (not shown), by a shaft 30. The two discs are rotatable as a unit around the shaft 30. The lengthwisely intermediate portion of the first wire $W_1$ is passed over the large disc 26 and the lengthwisely intermediate portion of a second wire $W_2$ is passed over the small disc 27 in an opposition direction while maintaining predetermined tension, each wire is fixed to one end of the corresponding disc in the circumferential direction thereof by corresponding fixing piece 26a or 27a. The large pulley 25 is provided with a neutral phase adjusting mechanism comprising an arcuate slot 29 formed axially through the small disc 27 and a bolt 28 extending through the slot 29 and threaded into and fixed to the large disc 26. Accordingly, by loosening the bolt and changing the relative position of the two discs, neutral phase adjustment can be accomplished.

The second wire $W_2$ is mounted so as to pass over the pulley groove of a disc member 36, provided in a rear wheel steering angle control mechanism D. Disc member 36 has cut-away front and rear peripheral portions, as shown, and the two free ends of the wire $W_2$ are fixed to the disc member 36. The details of the rear wheel steering angle control mechanism D will be described later. A steering ratio sensor 32 detects the ratio between the steering angles of the front and rear wheels, and inputs the resultant detected signal to a controller 33. A signal regarding the vehicle speed from a vehicle speed sensor 31 is also input to the controller 33. The controller 33 applies output signals according to the vehicle speed and the steering ratio to stepping motor 34 of the rear wheel steering angle control mechanism D. A control rod 37 in the rear wheel steering angle control mechanism D axially moves the hydraulic pressure control portion 38 of a control valve 39 connected to the hydraulic source 24 through the oil paths 20 and 21, thereby effecting the change-over, i.e., control, of the hydraulic pressure. This control valve 39 is operatively connected to a relay rod 86 for steerably supporting the rear wheels 2L and 2R by knuckle arms 14 and 15 and tie rods 16 and 17. A conventional power steering device 40 is provided on the relay rod 86 and power-assists during the rear wheel steering.

The rear wheel steering angle control mechanism D will now be described in detail with reference to FIGS. 6 and 7. The second wire $W_2$ has its lengthwise opposite ends fixed to the disc member 36. In the upper surface of the disc member 36, there is formed an arcuate slot 45 having a predetermined curvature about a point O on the coupling portion 43 of the control rod 37 and extending to the two peripheral cut-away chord portions. The disc member 36 further has a support rod 36a integrally on the underside thereof, which rotatably fits in a hole formed, for example, in the fixed base of the vehicle body (not shown). Accordingly, the disc member 36 is rotatable in the direction of arrow E around the support rod 36a. A pin 35b downwardly extending from the body portion 35c of a slider member 35 fits in the arcuate slot 45. Accordingly, the pin 35b is slidable along the arcuate slot 45. A pin 35d having a spherical projection 35a extends above the body portion 35c of the slider member. Two bars extending so as to be orthogonal to the circumferential direction at the center of the arcuate slot 45 further extend from the body portion 35c, and the end portions of these bars are provided with threadably engaging members 52 and 53 having threaded portions therein. These threadably engaging members 52 and 53 are threadably engaged with screw members 50 and 51, respectively, and therefore, are rectilinearly moved in the direction of arrow F as the screw members are rotated. The screw members 50 and 51 are rotatably but axially immovably supported at their opposite ends by two support members 48 and 49 and two support members 46 and 47, respectively. Each support member is fixed to the chassis base or the like (not shown).

The projection 35a of the pin 35d of the slider member 35 is turnably held by a coupling member 44a provided at one end of a transmission rod 44. The other end of the transmission rod 44 provides a spherical projection 44b, which is turnably held by a coupling member 43 provided at one end of the control rod 37.

Gears 54 and 55 are provided at one end of the screw members 50 and 51, respectively, and are in meshing engagement with a gear 56 provided on the shaft of the stepping motor 34. Each screw member is rotatable by the stepping motor, but is immovable in the axial direction. Although the slider member 35 is designed to be in a position S when the vehicle speed is 0, it may be designed to be in a neutral position Q. Design is made such that when the slider member 35 is at the center of the disc member 36, i.e., in the neutral position Q, the transmission rod 44 and the control rod 37 are arranged on a straight line.

The operation of the four-wheel steering apparatus constructed as described above will hereinafter be described with reference to FIGS. 1 and 6. In FIG. 1, when the steering wheel 1 is first operated in the direction of arrow Y, the steering operating member 2 also rotated in the same direction and the rack shaft 3 engaged therewith slides axially rightwardly. At the same time, the end plates 9 and 10 also move axially rightwardly with the rack shaft 3 and therefore, the first wire $W_1$ moves in the direction of arrow $Z_1$. As a result, the large pulley 25 rotates clockwise. Accordingly, the second wire $W_2$ also moves round clockwise and therefore, the disc member 36 also rotates clockwise. As a matter of course, it is apparent that when the steering wheel 1 is operated in the opposite direction, the above-described members will move or rotate in the opposite direction.

Figure 6:
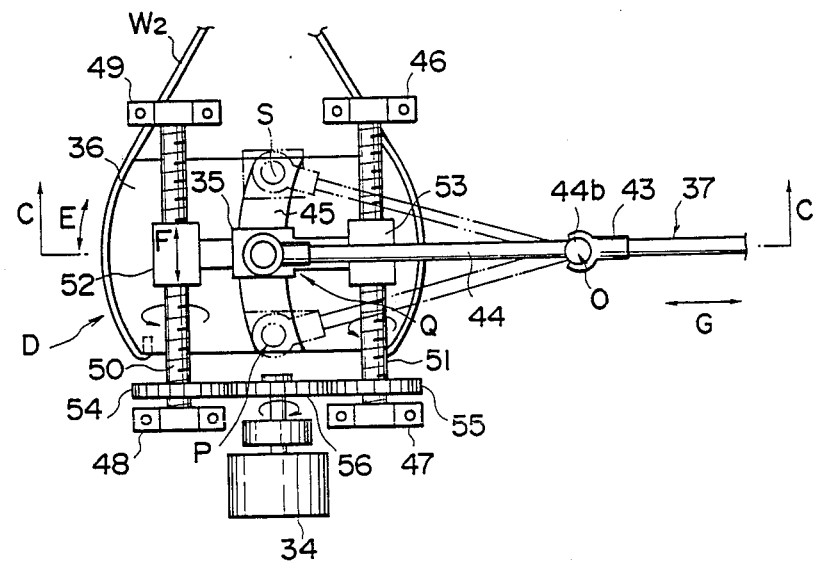
FIG. 6 shows the details of a rear-wheel steering angle control mechanism.
Figure 7:
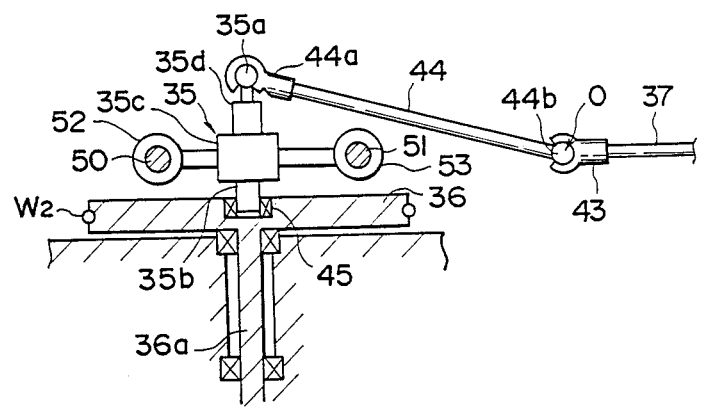
FIG. 7 is a partial cross-sectional view taken along line C—C of FIG. 6.

When the slider member 35 is in the neutral position Q shown in FIG. 6, even if the disc member 36 rotates, the disc member 36 only rotates about the slider member 35. Therefore, the transmission rod 44 and the control rod 37 hardly move. However, if the disc member 36 rotates when the slider member 35 is driven by the stepping motor 34 on the screws 50 and 51, and the slider member is located between a position S corresponding to the vehicle speed 0 and the neutral position Q, or between a position P corresponding to a predetermined vehicle speed and the neutral position Q, the control rod 37 moves forward or backward by a predetermined amount in the axial direction G thereof in accordance with the direction and amount of rotation of the disc member 36 and further with the position of the slider member 35. As a result, the hydraulic pressure control portion 38 of the control valve 39 moves to accomplish hydraulic pressure control, whereby the rear wheels are steered at an optimum steering ratio conforming to the amount of steering of the front wheels. At the same time, depending on whether the position S or the position P is assumed, the direction of steering of the rear wheels can also be controlled.

The vehicle speed sensor 31 always monitors the vehicle speed and sends a signal according to the vehicle speed to the controller 33. Furthermore, the steering ratio sensor 32, by reading the steering ratio between the front wheels and the rear wheels, sends a signal according to the steering ratio to the controller 33. In order to provide the optimum position of the slider member 35 at the steering ratio and vehicle speed at a particular point of time, the controller 33 drives the stepping motor 34 on the basis of pre-input information. The rear wheel steering angle control mechanism D operates in this manner and therefore, optimum steering of the rear wheels conforming to the steering of the front wheels is obtained.

The above-described four-wheel steering apparatus should be considered to be an illustrative example, and of course, various changes and modifications are possible without departing from the scope of the technical idea of the present invention. For example, the wires may be replaced by belts, and in some cases, by chains or the like. Also, a part of the wires may be changed to a coil spring or the like. The neutral phase adjusting mechanism for the two discs of the large pulley of the displacement reduction portion may be made of a bolt of the type which is fastened from the outside, instead of the through-bolt. Further, the number of the screws rotated by the stepping motor may be one, and the slider member may be supported by that screw member. The engagement between the slider member 35 and the transmission rod 44 need not always be accomplished by the spherical projection and coupling, and the pin of the slider member may be simply engaged with a through-hole formed in the end portion of the rod. Of course, the engagement between the transmission rod and the control rod may be changed in a similar manner. Further, the power steering mechanism need not be used for the rear wheels, and the tie rods 16 and 17 may be directly operated by the control rod 37.

According to the four-wheel steering apparatus of the present invention described above in detail, there are obtained the following effects.

The extraction of the steering angle of the front wheels becomes easier than in the prior art. Accordingly, depending on the layout of the vehicle, the present apparatus can be mounted in the existing power steering as well.

Since a string member such as a wire is used as the transmission member for the extraction of the steering angle of the front wheels, the layout in the case of the transmission to the rear wheels becomes unrestricted and therefore, a space saving effect is achieved. Accordingly, the level of freedom of design becomes higher, and the tunnel portion or the like in the lower part of the vehicle body can also be utilized effectively.

The rear-wheel steering control mechanism becomes simpler in construction and greater in rigidity, and the use of a large disc member as compared with the amount of eccentricity of the slider member leads to the possibility of increasing the output force for the rear-wheel steering.

Thus, reduced weight, compactness and lower cost of the four-wheel steering apparatus can be realized.

We claim:

1. A four-wheel steering apparatus of a vehicle comprising:
   a front-wheel steering mechanism for steering front wheels;

a rear-wheel steering mechanism for steering rear wheels;

a steering gear mechanism operatively connected to said front-wheel steering mechanism and effecting a steering operation;

a steering angle extracting mechanism operatively connected to said steering gear mechanism for extracting the steering angle of the front wheels, said steering angle extracting mechanism comprising a restraining member movable axially along an axis of the front wheels in response to the steering operation, and a string member fixed to said restraining member and displaceable lengthwise in response to the movement of said restraining member; and rear-wheel steering angle control means operatively connected to said steering angle extracting mechanism for controlling the amount and the direction of steer to be transmitted to the rear wheels, said rear-wheel steering angle control means comprising a rotatable member rotatable on a center of rotation in response to the displacement of said string member and having an arcuate guide portion of predetermined curvature, a slider member slidable along said guide portion to determine a steering ratio and the direction of the rear wheels with respect to the front wheels, and means including a transmission member engaged with said slider member and shiftable in accordance with the amount and the direction of rotation of said rotatable member and the position of said slider member along said guide portion for controlling said rear-wheel steering mechanism.

2. A four-wheel steering apparatus according to claim 1, wherein said rear-wheel steering control means has a second string member for rotating said rotatable member in response to the displacement of the first-mentioned string member, and a neutral phase adjusting mechanism for the steering angles of the front and rear wheels provided between said first-mentioned string member and said second string member.

3. A four-wheel steering apparatus according to claim 1, wherein said rear-wheel steering angle control means includes a controller for detecting vehicle speed and the steering ratio between the front and rear wheels and controlling the position of said slider member along said guide portion.

4. A four-wheel steering apparatus according to claim 3, wherein said rear-wheel steering angle control means further includes means for shifting the position of said slider member along said guide portion in response to information detected by said controller.

5. A four-wheel steering apparatus according to claim 4, wherein said controller controls the amount of eccentricity of said slider member from the center of said rotatable member.

6. A four-wheel steering apparatus according to claim 1, wherein said guide portion is a slot provided on said rotatable member and said slider member is engaged with and movable along said slot, and wherein said transmission member is pivotally engaged with said slider member.

* * * * *